United States Patent [19]

Tice

[11] Patent Number: 4,800,308

[45] Date of Patent: Jan. 24, 1989

[54] MOTORIZED CONTROL UNIT WITH TORSIONAL ELASTOMERIC BIAS

[75] Inventor: Bill Tice, Carlsbad, Calif.

[73] Assignee: ETI Systems, Oceanside, Calif.

[21] Appl. No.: 170,885

[22] Filed: Mar. 21, 1988

[51] Int. Cl.$^4$ ............... H02K 7/10; F16K 31/04; F16H 57/12

[52] U.S. Cl. ............... 310/83; 74/411; 185/40 R; 251/129.11; 310/41; 310/91

[58] Field of Search ............... 74/411; 185/40 R; 251/129.11, 129.13; 310/41, 80, 83, 89, 91, 112, 118; 318/45

[56] References Cited

U.S. PATENT DOCUMENTS

| | | | |
|---|---|---|---|
| 741,995 | 10/1903 | Baldwin et al. | 318/45 |
| 2,994,794 | 8/1961 | Jordan | 251/129.11 |
| 3,042,357 | 7/1962 | Engholdt | 251/129.11 |
| 3,434,025 | 3/1969 | Parkinson et al. | 318/48 |
| 4,203,573 | 5/1980 | Boss | 251/129.11 |
| 4,503,719 | 3/1985 | Hamano | 74/411 |
| 4,621,789 | 11/1986 | Fukamachi | 251/129.11 |
| 4,652,781 | 3/1987 | Andrei-Alexandru et al. | 310/83 |
| 4,748,865 | 6/1988 | Umezawa et al. | 74/411 |

Primary Examiner—Patrick R. Salce
Assistant Examiner—D. L. Rebsch
Attorney, Agent, or Firm—John J. Murphey

[57] ABSTRACT

A motorized control for driving a rotatable shaft-actuated device, such as a valve, comprising a base plate, a top housing, a work plate intermediate the base plate and the top housing and a plurality of stiff legs extending between the base plate and the housing, wherein drive motors are mounted on the work plate to drive a drive shaft that is attached to the shaft-actuated device. The improvement provides elastomeric bias means that remain at rest during normal operation of the control, and deform, to store energy, at the end of control travel, to be released at the begining of travel in the opposite direction, to aid the controller to break loose any binding in the valve.

22 Claims, 5 Drawing Sheets

MOTORIZED CONTROL UNIT WITH TORSIONAL ELASTOMERIC BIAS

BACKGROUND OF THE INVENTION

1. Field of the Invention

This invention pertains to the field of control units for rotatable shaft-actuated devices such as valves. More particularly, it relates to control units to reversibly operate valves between their full-open and full-closed positions.

2. Description of the Prior Art

Many processes involve valves and other rotatable shaft-actuated devices that need to be opened, closed and otherwise adjusted. In complicated processes involving numerous steps and equipment, so many valves may be involved that manual control is too difficult. Accordingly, there has been developed a series of devices known as "motorized controllers" that are attached to these devices to operate them, i.e., in the case of valves, to rotate the valve stems through electric motors and other associated components. These controllers drive the valves usually between fully-opened and fully-closed positions.

Three problems plague this industry. The first involves frictional buildup in the valve. While the valve stem is in motion, there is generally constant friction encountered in the valve stem and the load on the control unit drive remains relatively uniform. That is to say, there is no buildup of forces in the valve itself and the movement from full-open to full-closed position may be handled by the controller without difficulty. When, however, the valve reaches the fully closed position, a sudden increase in frictional load occurs in the valve stem because of the tightness achieved between the valve parts during opening or closure as well as some friction buildup caused by flow interruption in the line. To open a fully-closed valve therefore requires the controller to initially overcome this rather large frictional force. Once the valve is cracked open by the controller, the stem friction drops to the relatively low value throughout the remainder of valve travel. This high initial frictional load often causes disruption of movement in the valve or power drain on the control system that travels through the control network to reappear as some anomalous condition somewhere else in the system.

The second problem is associated with the single drive motor normally used to turn the controller drive shaft that, in turn, turns the valve stem. The introduction of power at only one point along the drive shaft produces transverse loads on the drive shaft and its bearings that result in rapid bearing wear and increased turning friction thus limiting the amount of turning torque developed in the controller. Further, different valves and/or processes require different stem turning speed (rpm) and different torque values. Accordingly, the manufacturer has need to maintain a large inventory of these special motors to avoid long delays in providing ready replacements. Such a situation raises the cost of each motor.

The third problem involves misalignment in the valve stem and valve actuator, either through vibration, ordinary wear of the parts or accidental bumping during normal maintenance operations. Even slight misalignment will generate frictional forces that oppose the rotation of the actuator and could result in incomplete actuation of the valve or, at the very least, increase the rate of wear of the actuator components.

To overcome the friction buildup problem, the prior art has suggested the use of coil springs arranged in a rather complicated fashion around the controller drive shaft to develop stored energy during drive shaft turning so as to release and provide additional energy when the controller begins its travel in opening the fully-closed valve. In U.S. Pat. No. 4,203,573 there is shown a coiled spring around the controller drive shaft to store energy as the drive shaft turns the valve stem from its opened to its closed position. When the motor is reversed to open the valve, the energy stored in the spring is released. While this teaching will provide a constant release of kinetic energy during valve travel, until the coil reaches its fully unwound position, there remains a transient counterforce applied to the valve actuator that may interfere with other phases of valve control. In U.S. Pat. No. 4,621,789 it is suggested to incorporate a coiled spring with a ratchet and pawl mechanism in a valve to be wound tight during operation of the valve for automatic release during power failure to reverse the valve position. The teaching, while suggesting the use of a coiled spring, is only for use in the event of power failure and otherwise will remain in a tightly wound configuration during operation of the actuator motor.

As to the second problem of single-point power input to the controller drive shaft, the prior art has suggested the use or more than one drive motor, however the use of these multiple motors is not for the purpose of turning the drive shaft solely in one direction. In U.S. Pat. No. 3,434,025 dual motors are used to reduce backlash in a control system by creating a drag torque in one motor to be overcome by the other motor during driving in one particular direction so that the teaching of two or more motors to provide direct drive input to the bull ring on the drive shaft is neither described nor suggested. In U.S. Pat. No. 3,231,803 the use of more than one drive motor for a drawworks is taught; however, the motors are specifically established far larger in size than would normally be required, and the field torque is altered through shunt means to eliminate the need for a variable speed transmission. In U.S. Pat. No. 741,995, a pair of motors is taught to be utilized in driving an electric capstan; however, there is no valve actuation involved in such a device and therefore there is no peak frictional load to be overcome during the beginning of movement of the capstan as there is in the instant matter.

As to the third problem, routine preventative maintenance procedures are employed to insure alignment of the actuator with the valve stem, however, this is time-consuming and adds to the cost of maintenance.

SUMMARY OF THE INVENTION

This invention overcomes these problems by providing in combination, a short stroke energy storage device for virtually instantaneous release during valve movement from either the close stop or open stop and a multidrive configuration to the controller drive shaft for lower net power usage and extended wear of the drive shaft bearings. The device also doubles as a flexing mechanism to reduce the aforesaid problems concerning slight valve-controller misalignment. The instantaneous release of stored energy to assist in opening a valve from its stopped position is achieved by configurating part of the controller to rotate beyond valve stem end travel, deform the energy storage unit and then lock up this stored energy to be released into the drive shaft at the beginning of opposite drive shaft rotation such as to open the fully closed valve. Subdividing the drive motors permits a wider variety of motors to be chosen whose combination will provide the required actuator rpm and drive torque thus lessening the large inventory heretofore needed. In addition, spacing the multiple motors equiangularly about the drive shaft reduces off-center drive characteristics, maintains shaft alignment and reduces bearing wear. Split motor drive therefore provides more torque to be realized in the output shaft than may be achieved by using a single motor of the same size and power requirements. This makes for a motorized control unit that can be smaller and utilized less electrical energy than those single motor drives heretofore taught in the prior art.

By associating the split drive motors relatively close to the elastomeric material, the drive shaft and associated parts are maintained in true concentric fashion and bearing wear is greatly reduced while at the same time the elastomeric deformation may take place without throwing the rest of the components out of alignment. The result is that a smaller motorized control unit may drive a larger valve than would otherwise be possible from the teachings of the prior art, the motorized control unit will last far longer because there is less transient force vectors applied to the bearings and a smaller unit may be used to provide a significantly high input of potential energy to break loose a closed valve without the need to couple springs and other biasing devices about the shaft that often interfere in other aspects of the control cycle.

Accordingly, the main object of this invention is to provide a longer wearing motorized control unit that has a longer bearing life for the drive shaft. Other objects include a motorized control unit that will turn a larger load in the valve by the use of a split motor drive over that produced by a single motor drive; a motorized control unit providing a large input of kinetic energy at the point where a fully closed valve begins its opening travel without the attendant interference of further actuation by coiled springs or other biasing devices; a motorized control unit that provides for slight rotation of the work plate without causing misalignment of other parts of the motorized control unit; a motorized control unit that compensates for slight misalignment of the controller and the rotatable shaft-actuated device; and a device that provides a measure of shock absorbency between the controller and the device. These and other objects of the invention will become more apparent when reading the description of the preferred embodiment along with the drawings appended hereto. The scope of protection desired by the inventor may be gleaned from a fair reading of the claims which conclude this specification.

DESCRIPTION OF THE PREFERRED EMBODIMENT

Figure 1:
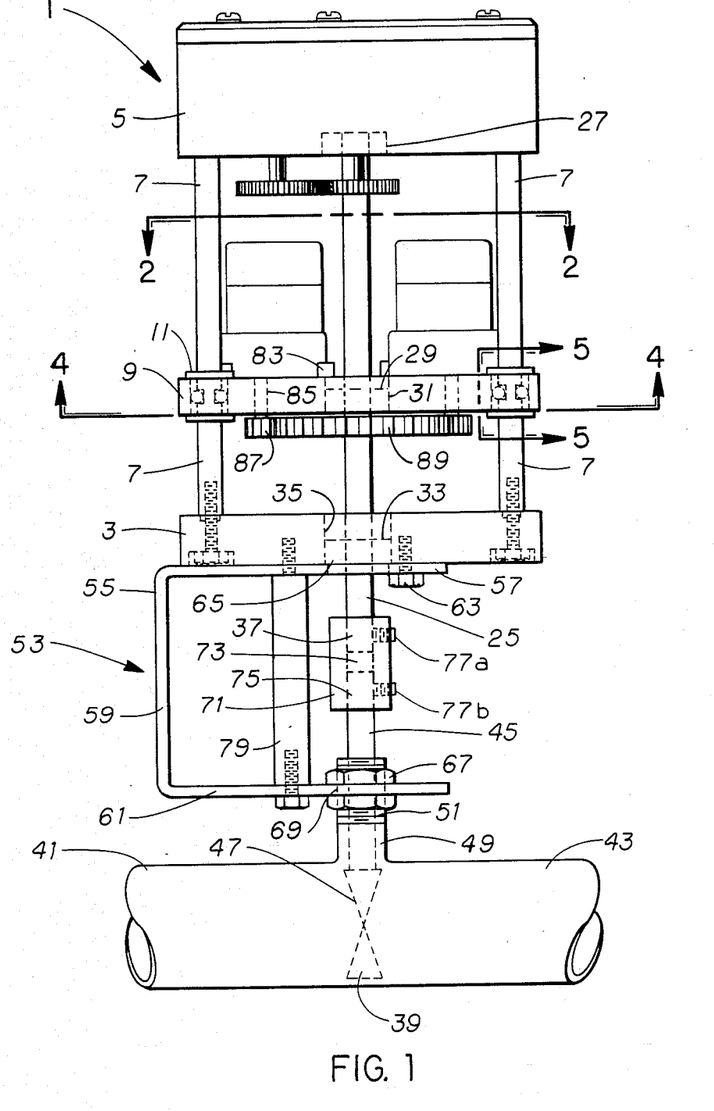
FIG. 1 is a side elevational plan view of the preferred embodiment of the motorized control of this invention.
Figure 2:
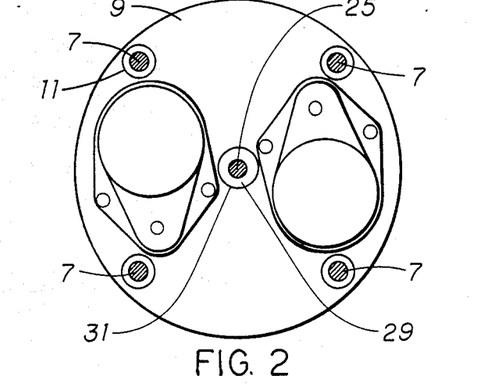
FIG. 2 is a top plan view of the work plate taken along lines 2—2 in FIG. 1.
Figure 3:
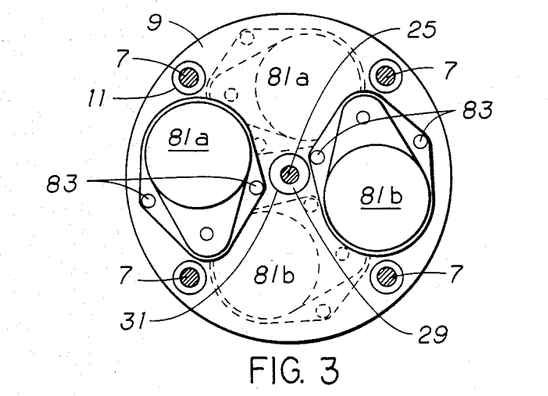
FIG. 3 is another view similar to FIG. 2 showing two work plates, stacked one upon the other, each holding a separate pair of drive motors.
Figure 7:
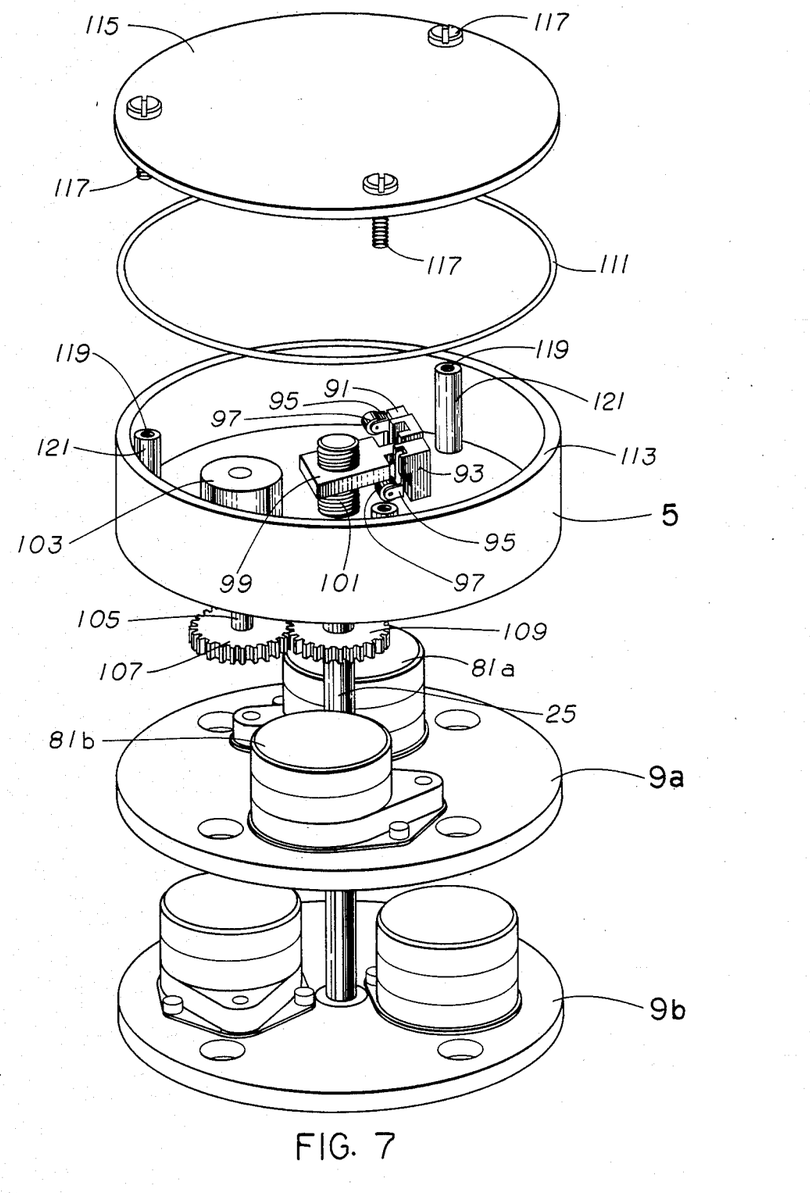

The preferred embodiment of the motorized control of this invention is shown in FIG. 1 generally at 1 and comprises a base plate 3 of metal or other hard material, generally shaped in a flat, circular configuration, and a rigid top housing 5 that is hollow and contains elements shown more clearly in FIG. 7. Housing 5 is spaced above base plate 3 and preferably is of the same general circular configuration and diameter. A plurality of stiff legs 7 extend between plate 3 and housing 5 and are preferably spaced equidistantly about their periphery (see FIGS. 2, 3 and 8) to hold base plate 3 and top housing 5 in fixed spaced-apart relationship.

Figure 5:
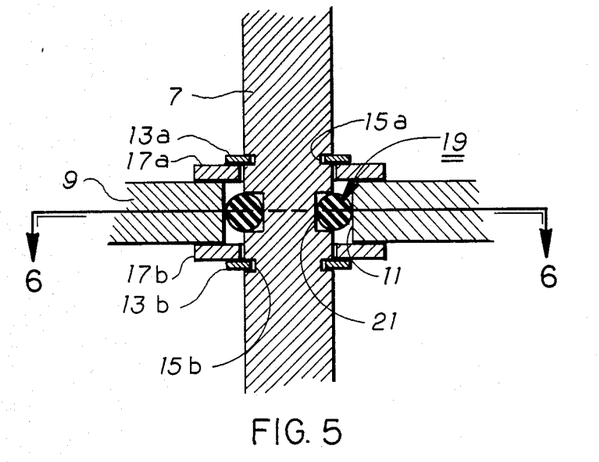
FIG. 5 is a side elevational sectional view of the portion of the work plate taken along lines 5—5 in FIG. 1.

A work plate 9 having a circular outer configuration generally the same as base plate 3 is located intermediate base plate 3 and top housing 5 and adapted to have legs 7 pass through apertures 11 formed therein. As shown in FIG. 5, work plate 9 is held in fixed spaced-apart relation between base plate 3 and top housing 5 through the interposition of a pair of C-clips 13a and 13b that are partially received in respective notches or circumferential slots 15a and 15b that are located in legs 7 spaced above and below apertures 11. A pair of washers 17a and 17b are positioned over apertures 11, adjacent the top and bottom surfaces respectively of work plate 9 and centered about each leg. C-clips 13a and 13b received in their respective slots 15a and 15b overlay washers 17a and 17b, thus prohibiting movement of plate 9 up and down the length of legs 7.

FIG. 1 shows a single work plate 9; however, two, three or more work plates may be employed intermediate base plate 3 and top housing 5, stacked one on top of another, and such configuration is fully contemplated in this invention. Shown in FIG. 7 are two work plates, 9a and 9b, one on top of another, each carrying a set of drive motors as will be more fully explained. Each plate is mounted in alignment with the other plates and mounted on legs 7 as hereinbelow described.

Figure 4:
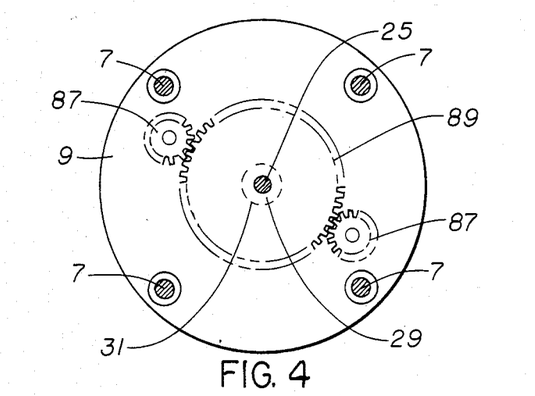
FIG. 4 is a bottom plan view of the work plate taken along lines 4—4 in FIG. 1.
Figures 6A, 6B:
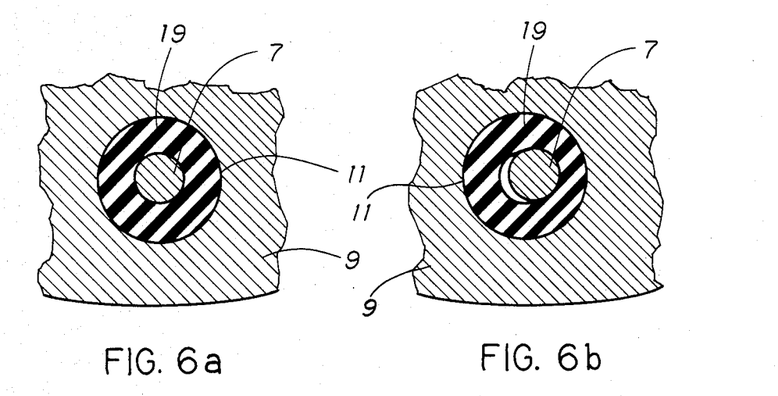
FIGS. 6a and 6b are top plan views of the elastomeric material in place about the leg passing through the work plate taken along lines 6—6 in FIG. 5 showing the elastomeric material in its loaded and unloaded condition respectively; and, FIG. 7 is an isometric view of the top housing shown in FIG. 1 with the top cover and gasket removed.

Elastomeric means 19 is provided to absorb energy at the end of shaft travel, store it until reverse shaft motion is called for, then to discharge the stored energy into the shaft-actuated device to aid actuator 1 in beginning its reverse rotation. As shown in FIGS. 4, 6a and 6b, one form of means 19 is designed to fill the gap between apertures 11, through which leg 7 passes, and a narrowed area 21 formed in leg 7 adjacent work plate 9. In this configuration, work plate 9 is restrained via clip 13a and 13b from vertical movement up and down legs 7; however, elastomeric means 19 permit some rotational movement of work plate 9 with respect to the fixed positions of base plate 3 and top housing 5. Means 19 may take many forms such as a collar made of rubber or a flat rubber washer. This form of means 19 is an O-ring 23 shown in FIGS. 4, 5a and 5b made of rubber or elastomeric compounds such as styrene-butadiene rubber (SBR), polymers of ethylene, propylene and butadiene (EPDM) and rubber-plastic blends such as acrylonitrile-butadiene-styrene (ABS) polymers.

A controller drive shaft 25 is centrally located in control 1 and depends from a journalized fitting 27 in top housing 5 downward through a clearance hole 29, carried in a center aperture 31 in work plate 9, and further through a bearing 33, carried in a center aperture 35 in base plate 3, to terminate at a lower distal end 37.

Control 1 is mounted over a rotatable shaft-actuated device such as a valve 39 position between fluid flow pipes 41 and 43 as shown in FIG. 1. A valve stem 45 extends upward from a valve body 47 (shown in schematic only) through a barrel 49 that contains threads 51 on the outside thereof. A controller attaching means 53 is used to mount controller 1 to valve barrel 49 and comprises a plate 55 having integral top portion 57, vertical side portion 59 and bottom portion 61. Top portion 57 is affixed to the bottom of base plate 3 with bolts 63. Bottom portion 61 has an aperture 69 formed therein that is adapted to fit over valve barrel 49 and held tightly thereon between a pair of nuts 67 tightened on barrel threads 51. Apertures 65 and 69 are formed in top portion 57 and bottom portion 61 respectively, allowing drive shaft 25 and barrel 49 to pass therethrough. A collar 71 having formed therethrough a vertical bore 73 is provided between lower distal end 37 of drive shaft 25 and the top end 75 of valve stem 45 and set screws 77a and 77b inserted therein to hold said ends in fixed relation. A brace 79 is bolted between top portion 57 and bottom portion 61 near apertures 67 and 69 to aid in rigidifying the connection between control 1 and valve body 47.

A pair of drive motors 81a and 81b are mounted on work plate 9 equiangularly about central aperture 31 by fasteners or screws 83 that secure said motors to the top surface thereof, said motors providing, in combination, the torque and rpm desired at drive shaft 25. While the drive motors contemplated for use in this invention may be of the direct current (d.c.) type, it is preferred that they be of the alternating current (a.c.) type. Further, because there are two or more motors employed, a.c. motors of the same of different rotational speeds (rpm) and different torque outputs may be combined to produce the desired net output rpm and torque. Such motors may be chosen from a wide selection of readily available motors so as to avoid the single purpose, single use motor requirement of the prior art. Each of motors 81a and 81b provides power from a drive shaft and drive pinion (not shown) to an offset output spindle 85 and pinion 87, and said pinion 87 engaging the periphery and the cogs of a bull gear 89 centrally mounted on drive shaft 25 between work plate 9 and base plate 3. Bull gear 89 is mounted close to work plate 9 to reduce the potential for plate misalignment during torque loading of the work plate as will be hereinafter more fully explained.

Drive motors 81a and 81b may be mounted on work plate 9 in a plurality of three or more depending upon their size and shape. (The electrical wiring has been removed from the drawings for clarity.) They may be mounted on two or more work plates 9a and 9b as shown in FIG. 7 and the plates stacked one above the other, each set of motors providing power through their drive shaft and pinion to a bull gear located just below the respective work plate equiangularly about the central aperture 31 so as to provide balanced power input to drive shaft 25 through bull gear 89 and reduce the stress on drive shaft bearings 33. This allows the motorized control unit to be capable of operating a wider size and torque range of valves than was obtainable with the single-motor drive of the prior art.

A pair of limit switches 91 and 93 are positioned inside top housing 5, each containing an extended arm 95 and roller 97 for actuating said switches. A plate 99 is threadably received on an extension 101 of drive shaft 25 and is restrained from rotational movement by a tab and slot arrangement (not shown) that permits threaded plate 99 to ride up and down threaded shaft extension 101 as a function of turning of drive shaft 25. This arrangement permits threaded plate 99 to contact each switch roller 97 and cause each arm 95 to activate its respective switch to shut off the power to drive motors 81a and 81b and stop the rotation of drive shaft 25 at a predetermined rotational or angular movement, preferably at slightly (i.e., a few rotational degrees) beyond full valve travel to opened and/or closed position.

A position indicator 103 is also mounted inside top housing 5 and comprises a voltage divider or potentiometer of similar device that indicates the position to which motorized controller 1 has turned valve 39. Indicator 103 is driven by a spindle 105 and cog wheel 107 that engages another cog wheel 109 mounted on drive shaft 25. As drive shaft 25 is turned by drive motors 81a and 81b the intermeshed cog wheels 107 and 109 turn spindle 105 that moves the potentiometer to a position where an applied input voltage (not shown) is matched through a variable resistance. A gasket 111 is set on top housing rim 113, and a cover plate 115 is fixed over top housing 5 and secured thereto by threaded screws 117 that are received in threaded apertures 119 in bosses 121 formed in top housing 5, to completely seal the internal workings of top housing 5 from the elements.

In operation, power is applied through various connection means such as computer operated relays (not shown) to energize drive motors 81a and 81b. Because said motors are placed equiangularly about drive shaft 25, the power delivered through their respective spindles and pinions 85 and 87 to bull gear 89 provides balanced loading to central drive shaft 25, thereby relieving the stress on central drive shaft bearings 29 and 33 caused by single drive configurations. Drive shaft 25, through the coupling feature of collar 71, turns valve stem 45 to open and close valve 39.

Limit switches 91 and 93 are set to terminate electric power to drive motors 81a and 81b and turn drive shaft 25 a fraction of a turn beyond turning valve stem 45 to its full-opened and full-closed position. This slight excess turning in drive shaft 25 produces a torsional load on work plate 9, forcing it to rotate slightly in the opposite direction. Elastomeric means 19, being the only yieldable element in work plate 9, is forced into compression in the opposite direction from drive shaft 25 movement, as shown in FIG. 6a. This compression represents an accumulation of kinetic energy. This compressed state of means 19 remains constant after power is terminated to motors 81a and 81b due to the intergear locking established between the motor drive shafts, drive pinions, spindles 85, pinions 87 and bull gear 89. Upon energizing (through computer control or the like, not shown) the reverse rotation windings in drive motors 81a and 81b, to turn drive shaft 25 in the opposite direction, elastomeric means 19 releases its stored or potential energy and work plate 9 is urged in the opposite rotational direction from which it was loaded, thus providing a spurt of energy to drive shaft 25 to break valve stem 45 loose from its high friction setting. Thereafter, elastomeric means 19 remains centered or neutralized, as shown in FIG. 6b, and does not become involved in further energy storage until drive shaft reaches the end of its turning motion in the new direction whereupon deformation once again occurs with the concomitant buildup of potential energy.

Figure 8:
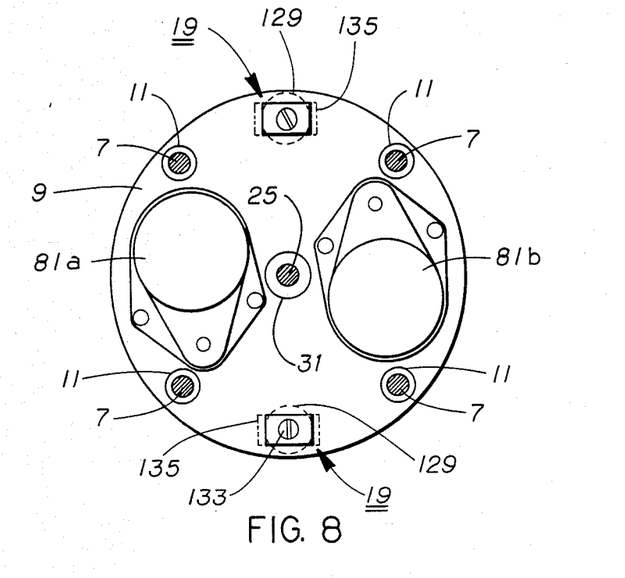
FIG. 8 is a top view of another embodiment of the elastomeric means useful in this invention.
Figure 9:
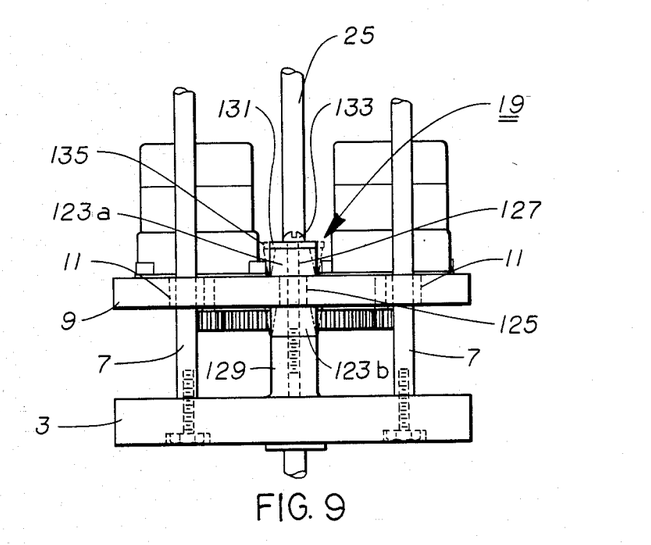
FIG. 9 is a side view of the embodiment shown in FIG. 8.

As shown in FIGS. 8 and 9, another form of elastomeric means 19 is in the form of a pair of elastomeric pads 123a and 123b clamped against opposite sides of work plate 9 adjacent an aperture 125 and held thereagainst by a long bolt 127 passing therethrough and into a boss 129 that is welded or otherwise attached to base plate 3. A washer 131 is placed between the head 133 of bolt 127 and top pad 123a to hold the assembly rigid, as well as to prevent damage to said pads during flexation.

As shown in FIG. 9, at the end of shaft rotation, limit switch 93 is programmed or set to have drive motors 81a and 81b to turn drive shaft 25 slightly beyond the full close or full open stop in valve 39. This causes work plate 9 to be twisted relative to base plate 3, thereby deforming pads 123a and 123b in the direction of the twist; this is shown as dotted outlines 135. Upon reverse rotation of drive shaft 25, pads 123a and 123b will twist work plate 9 in the direction of the reverse rotation, to return to their normal configuration, thereby releasing the energy stored in said pads into drive shaft 25 and aid the reverse rotation of valve stem 45.

What I claim is:

1. A motorized control, for driving a rotatable shaft-actuated device, comprising:
   (a) a base plate for mounting above the device;
   (b) a top housing spaced above said base plate;
   (c) a plurality of stiff legs extending between said base plate and said housing to hold them in fixed spacial relationship;
   (d) a work plate intermediate said base plate and said top housing, held in spaced-apart relationship therebetween through elastomeric means mounted thereto to permit torsional movement of said work plate with respect to said base plate;
   (e) a rotatable drive shaft depending from said top housing through said work plate and said base plate terminating at a lower distal end adapted for connection to the rotatable actuation shaft of the device; and,
   (f) a drive motor mounted on said work plate and containing an output shaft and pinion engaging the periphery of a central bull gear centrally mounted on said drive shaft including means for starting, stopping and reversing the rotation of said drive motor and drive shaft;
   (g) wherein said elastomeric means is caused to deform and store energy when said drive motor is caused to over-rotate said drive shaft at the end of rotational travel of the shaft-actuated device and twist said work plate with respect to said base plate so that, upon reverse travel of said drive shaft to drive the actuation shaft in the opposite direction, said elastomeric means returns to its normal shape and releases the stored energy into said drive shaft at the beginning of the reverse rotational movement.

2. The control of claim 1 wherein said elastomeric means comprises a pair of elastomeric pads attached between said work plate and said base plate to support said work plate thereon and to allow torsional movement therebetween.

3. The control of claim 2 wherein said elastomeric pads include a boss, to support them on said base plate, and screw means to secure them to said brace.

4. A motorized control, for driving a rotatable shaft-actuated device, comprising:
   (a) a base plate for mounting above the device;
   (b) a top housing spaced above said base plate;
   (c) a plurality of stiff legs extending between said base plate and said housing to hold them in fixed spacial relationship;
   (d) a work plate intermediate said base plate and said top housing, held in spaced-apart relationship therebetween through elastomeric means mounted between said work plate and said legs and including enlarged apertures through which said legs pass to permit torsional movement of said work plate with respect to said base plate;
   (e) a rotatable drive shaft depending from said top housing through said work plate and said base plate terminating at a lower distal end adapted for connection to the rotatable actuation shaft of the device; and,
   (f) a pair of drive motors mounted on said work plate on opposite sides of said drive shaft each having an output shaft and pinion engaging the periphery of a central bull gear centrally mounted on said drive shaft including means for starting, stopping and reversing the rotation of said drive motor and drive shaft;
   (g) wherein said elastomeric means is caused to deform and store energy through compression when said drive motors are caused to over-rotate said drive shaft at the end of rotational travel of the shaft-actuated device and twist said work plate with respect to said base plate so that, upon reverse travel of said drive shaft, to drive the actuation shaft in the opposite direction, said elastomeric means returns to its normal shape and releases the stored energy into the drive shaft at the beginning of the reverse rotational movement.

5. The control of claim 4 wherein said elastomeric means comprises O-rings containing elastomeric material surrounding each leg, as said leg passes through said aperture in said work plate, said O-rings in circumferential contact with said aperture for compression on one side when said work plate is twisted at the end of drive shaft travel.

6. The control of claim 5 wherein said O-rings are retained in said apertures by washers held against opposite surfaces of said work plate by clips surrounding each said leg partially received in circumferential slots formed in said legs.

7. The control of claim 4 wherein said means for starting, stopping and reversing the rotation of said drive motors include at least one limit switch in said top housing, actuated by said drive shaft, for disconnecting power to said drive motors at a preselected rotation of the actuation shaft beyond full opening or full closing of the device.

8. The control of claim 7 further including an arm extending from said switch and a roller on said arm, a plate threadably received on an extension of said drive shaft adapted to ride up and down on said extension, as a function of turning said drive shaft, to contact said roller and move said arm to activate said switch and terminate power to said drive motors.

9. The control of claim 4 further including means for mounting said base plate above the device to be actuated.

10. The control of claim 9 wherein said means comprises a plate having integral top, said and bottom portions, said top portion attachable to said base plate, said bottom portion attachable to the rotatable shaft-actuated device and said side portion reinforced with a brace to rigidify said control and the connected device.

11. The control of claim 4 wherein said drive motors are powered by alternating current.

12. A motorized control, for driving a rotatable shaft-actuated device, comprising:
(a) a base plate for mounting above the device;
(b) a top housing spaced above said base plate;
(c) a plurality of stiff legs extending between said base plate and said housing to hold them in fixed spacial relationship;
(d) a plurality of work plates intermediate said base plate and said top housing, each held in fixed spaced-apart relationship therebetween by said legs and including enlarged apertures through which said legs pass to permit torsional movement of said work plates with respect to said base plate;
(e) a rotatable drive shaft depending from said top housing through said work plates and said base plate terminating at a lower distal end adapted for connection to the actuation shaft of the device; and
(f) a plurality of drive motors mounted on said work plates spaced equiangular about said drive shaft each having an output shaft and pinion engaging the periphery of a central bull gear centrally mounted on said drive shaft, said drive motors having rotational speeds and output torques that, in combination, provide the rotational speed and drive torque needed in said drive shaft and including means for starting, stopping and reversing the rotation of said drive motors and drive shaft;
(g) wherein said elastomeric means is caused to deform and store energy through compression when said drive motors are caused to over-rotate said drive shaft at the end of rotational travel of the shaft-actuated device and twist said work plates with respect to said base plate so that, upon reverse travel of said drive shaft, to drive the actuation shaft in the opposite direction, said elastomeric means returns to its normal shape and releases the stored energy into the drive shaft at the beginning of the reverse rotational movement.

13. The control of claim 12 wherein said elastomeric means comprises O-rings containing elastomeric material surrounding each leg, as said leg passes through said aperture in said work plate, said O-rings in circumferential contact with said aperture for compression on one side when said work plates ares over-rotated at the end of drive shaft travel.

14. The control of claim 13 wherein said O-rings are retained in said apertures by washers held against opposite surfaces of said work plate by clips surrounding each said leg partially received in circumferential slots formed in said legs.

15. The control of claim 12 wherein said means for starting, stopping and reversing the rotation of said drive motors include at least one limit switch in said top housing, actuated by said drive shaft, for disconnecting power to said drive motors at a preselected rotation of the actuation shaft beyond full opening or full closing of the device.

16. The control of claim 15 further including an arm extending from said switch and a roller on said arm, a plate threadably received on an extension of said drive shaft adapted to ride up and down on said extension, as a function of turning said drive shaft, to contact said roller and move said arm to activate said switch and terminate power to said drive motors.

17. The control of claim 12 further including means for mounting said base plate above the device to be actuated.

18. The control of claim 17 wherein said means comprises a plate having integral top, said and bottom portions, said top portion attachable to said base plate, said bottom portion attachable to the rotatable shaft-actuated device and said side portion reinforced with a brace to rigidify said control and the connected device.

19. The control of claim 12 wherein said drive motors are powered by alternating current.

20. A motorized control, for driving a rotatable shaft-actuated device, comprising:
(a) a base plate for mounting above the device;
(b) a top housing spaced above said base plate;
(c) a plurality of stiff legs extending between said base plate and said housing to hold them in fixed spacial relationship;
(d) a work plate intermediate said base plate and said top housing, held in spaced-apart relationship therebetween through elastomeric means mounted between said work plate and said legs and including enlarged apertures through which said legs pass to permit torsional movement of said work plate with respect to said base plate;
(e) a rotatable drive shaft depending from said top housing through said work plate and said base plate terminating at a lower distal end adapted for connection to the rotatable actuation shaft of the device; and
(f) at least two alternating current-powered electric drive motors mounted on said work plate equiangularly about said drive shaft, each having an output shaft and pinion engaging the periphery of a central bull gear centrally mounted on said drive shaft;
(g) wherein said elastomeric means is caused to deform and store energy through compression when said drive motors are caused to over-rotate said drive shaft at the end of rotational travel of the shaft-actuated device and twist said work plate with respect to said base plate so that, upon reverse travel of said drive shaft, to drive the actuation shaft in the opposite direction, said elastomeric means returns to its normal shape and releases the stored energy into the drive shaft at the beginning of the reverse rotational movement.

21. The control of claim 20 wherein said elastomeric means comprises O-rings containing elastomeric material surrounding each leg, as said leg passes through said aperture in said work plate, said O-rings in circumferential contact with said aperture for compression on one side when said work plate is over-rotated at the end of drive shaft travel.

22. The control of claim 21 wherein said O-rings are retained in said apertures by washers held against opposite surfaces of said work plate by clips surrounding each said leg partially received in circumferential slots formed in said legs.

* * * * *